United States Patent
Lee

(10) Patent No.: US 8,199,385 B2
(45) Date of Patent: Jun. 12, 2012

(54) IMAGE FORMING APPARATUS TO SAVE TONER AND METHOD TO CONTROL THE SAME

(75) Inventor: Ho Keun Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 738 days.

(21) Appl. No.: 12/029,594

(22) Filed: Feb. 12, 2008

(65) Prior Publication Data

US 2008/0198420 A1    Aug. 21, 2008

(30) Foreign Application Priority Data

Feb. 15, 2007   (KR) .................. 10-2007-0016013

(51) Int. Cl.
*H04N 1/46* (2006.01)

(52) U.S. Cl. ......... 358/534; 358/535; 358/536; 358/1.9; 358/1.2; 358/466; 358/465; 358/3.27; 358/3.06; 358/3.01; 382/262; 382/264; 382/266

(58) Field of Classification Search .......... 358/534, 358/535, 536, 1.9, 1.2, 466, 465, 3.27, 3.06, 358/3.01; 382/262, 264, 266
See application file for complete search history.

(56) References Cited

U.S. PATENT DOCUMENTS

| | | | | |
|---|---|---|---|---|
| 5,668,635 | A | * | 9/1997 | Tomida et al. ................ 358/296 |
| 5,822,502 | A | * | 10/1998 | Li et al. .......................... 358/1.9 |
| 5,946,450 | A | * | 8/1999 | Ebner et al. .................... 358/1.9 |
| 6,166,751 | A | * | 12/2000 | Yamada ........................ 347/131 |
| 2005/0190408 | A1 | * | 9/2005 | Vittitoe ........................ 358/3.06 |

FOREIGN PATENT DOCUMENTS

JP    2005-86719    3/2005

* cited by examiner

*Primary Examiner* — Benny Q Tieu
*Assistant Examiner* — Paul F Payer
(74) *Attorney, Agent, or Firm* — Stanzione & Kim, LLP

(57) ABSTRACT

An image forming apparatus to save toner, which can increase the sharpness of printed data (for example, images or characters) on a printing medium while achieving toner saving, and a method to control the same. The image forming apparatus includes a determinator, a storage unit, and a halftoning processor. The determinator receives a command signal to print and then determines whether or not the received command signal is a command signal for a toner saving mode. The storage unit stores a halftone table in which an LPI higher than a normal LPI is set. If the received command signal is a command signal for the toner saving mode, the halftoning processor generates and outputs halftoning result by comparing gray level values corresponding to pixels of received input image data with grayscale values of the stored halftone table.

11 Claims, 27 Drawing Sheets

Fig. 1A(Related Art)

Text Test Text Test

Fig. 1B(Related Art)

| 255 | 255 | 128 | 128 | 128 | 128 | 255 | 255 | 255 |
|---|---|---|---|---|---|---|---|---|
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |
| 255 | 255 | 128 | 128 | 128 | 128 | 255 | 255 | 255 |

Fig. 1C(Related Art)

| 254 | 226 | 162 | 30 | 2 | 39 | 153 | 217 | 255 |
|---|---|---|---|---|---|---|---|---|
| 234 | 194 | 102 | 62 | 23 | 71 | 111 | 185 | 233 |
| 178 | 78 | 118 | 130 | 169 | 95 | 127 | 87 | 177 |
| 14 | 46 | 146 | 210 | 241 | 201 | 137 | 55 | 15 |
| 7 | 36 | 156 | 220 | 252 | 228 | 164 | 28 | 4 |
| 20 | 68 | 108 | 188 | 236 | 196 | 100 | 60 | 21 |
| 172 | 92 | 124 | 84 | 180 | 76 | 116 | 132 | 171 |
| 244 | 204 | 140 | 52 | 12 | 44 | 148 | 212 | 243 |
| 251 | 229 | 165 | 27 | 5 | 33 | 159 | 223 | 248 |
| 237 | 197 | 99 | 59 | 17 | 65 | 105 | 191 | 235 |
| 181 | 75 | 114 | 134 | 175 | 89 | 121 | 81 | 183 |
| 11 | 43 | 150 | 213 | 247 | 207 | 143 | 49 | 9 |
| 1 | 35 | 157 | 221 | 254 | 229 | 165 | 27 | 2 |
| 19 | 67 | 107 | 189 | 237 | 197 | 99 | 59 | 22 |
| 173 | 91 | 123 | 83 | 181 | 75 | 115 | 133 | 170 |
| 245 | 205 | 141 | 51 | 11 | 43 | 149 | 213 | 242 |
| 250 | 227 | 163 | 29 | 6 | 40 | 153 | 216 | 249 |
| 235 | 195 | 101 | 61 | 24 | 71 | 111 | 185 | 232 |
| 179 | 77 | 117 | 131 | 169 | 95 | 127 | 87 | 177 |
| 13 | 45 | 147 | 211 | 240 | 201 | 137 | 55 | 16 |

Fig. 1D(Related Art)

| 254 | 226 | 162 | 30  | 2   | 38  | 153 | 217 | 255 |
|-----|-----|-----|-----|-----|-----|-----|-----|-----|
| 234 | 194 | 102 | 62  | 23  | 71  | 111 | 185 | 233 |
| 178 | 78  | 118 | 130 | 169 | 95  | 127 | 87  | 177 |
| 14  | 46  | 146 | 210 | 241 | 201 | 137 | 55  | 15  |
| 7   | 36  | 156 | 220 | 252 | 228 | 164 | 28  | 4   |
| 20  | 68  | 108 | 188 | 236 | 196 | 100 | 60  | 21  |
| 172 | 92  | 124 | 84  | 180 | 76  | 116 | 132 | 171 |
| 244 | 204 | 140 | 52  | 12  | 44  | 148 | 212 | 243 |
| 251 | 229 | 165 | 27  | 5   | 33  | 159 | 223 | 248 |
| 237 | 197 | 99  | 59  | 17  | 65  | 105 | 191 | 239 |
| 181 | 75  | 114 | 134 | 175 | 89  | 121 | 81  | 183 |
| 11  | 43  | 150 | 213 | 247 | 207 | 143 | 49  | 9   |
| 1   | 35  | 157 | 221 | 254 | 229 | 165 | 27  | 2   |
| 19  | 67  | 107 | 189 | 237 | 197 | 99  | 59  | 22  |
| 173 | 91  | 123 | 83  | 181 | 75  | 115 | 133 | 170 |
| 245 | 205 | 141 | 51  | 11  | 43  | 149 | 213 | 242 |
| 250 | 227 | 163 | 29  | 6   | 40  | 153 | 216 | 249 |
| 235 | 195 | 101 | 61  | 24  | 71  | 111 | 185 | 232 |
| 179 | 77  | 117 | 131 | 169 | 95  | 127 | 87  | 177 |
| 13  | 45  | 147 | 211 | 240 | 201 | 137 | 55  | 16  |

Fig. 2A(Related Art)

| 254 | 226 | 162 | 30 | 2 | 39 | 153 | 217 | 255 |
|---|---|---|---|---|---|---|---|---|
| 234 | 194 | 102 | 62 | 23 | 71 | 111 | 185 | 233 |
| 178 | 78 | 118 | 130 | 169 | 95 | 127 | 87 | 177 |
| 14 | 46 | 146 | 210 | 241 | 201 | 137 | 55 | 15 |
| 7 | 36 | 156 | 220 | 252 | 228 | 164 | 28 | 4 |
| 20 | 68 | 108 | 188 | 236 | 196 | 100 | 60 | 21 |
| 172 | 92 | 124 | 84 | 180 | 76 | 116 | 132 | 171 |
| 244 | 204 | 140 | 52 | 12 | 44 | 148 | 212 | 243 |
| 251 | 229 | 165 | 27 | 5 | 33 | 159 | 223 | 248 |
| 237 | 197 | 99 | 59 | 17 | 65 | 105 | 191 | 239 |
| 181 | 75 | 114 | 134 | 175 | 89 | 121 | 81 | 183 |
| 11 | 43 | 150 | 213 | 247 | 207 | 143 | 49 | 9 |
| 1 | 35 | 157 | 221 | 254 | 229 | 165 | 27 | 2 |
| 19 | 67 | 107 | 189 | 237 | 197 | 99 | 59 | 22 |
| 173 | 91 | 123 | 83 | 181 | 75 | 115 | 133 | 170 |
| 245 | 205 | 141 | 51 | 11 | 43 | 149 | 213 | 242 |
| 250 | 227 | 163 | 29 | 6 | 40 | 153 | 216 | 249 |
| 235 | 195 | 101 | 61 | 24 | 71 | 111 | 185 | 232 |
| 179 | 77 | 117 | 131 | 169 | 95 | 127 | 87 | 177 |
| 13 | 45 | 147 | 211 | 240 | 201 | 137 | 55 | 16 |

Fig. 4A

| 244 | 134 | 12 | 61 | 240 | 131 | 16 | 54 | 238 |
|---|---|---|---|---|---|---|---|---|
| 198 | 90 | 163 | 125 | 195 | 93 | 170 | 118 | 202 |
| 1 | 52 | 248 | 140 | 8 | 45 | 251 | 147 | 5 |
| 172 | 116 | 204 | 84 | 179 | 109 | 211 | 77 | 174 |
| 230 | 154 | 26 | 36 | 227 | 157 | 29 | 43 | 234 |
| 218 | 70 | 189 | 99 | 220 | 67 | 181 | 106 | 213 |
| 17 | 57 | 236 | 135 | 20 | 60 | 243 | 132 | 13 |
| 167 | 121 | 199 | 89 | 164 | 124 | 196 | 92 | 160 |
| 250 | 149 | 6 | 47 | 252 | 145 | 4 | 52 | 245 |
| 212 | 75 | 177 | 111 | 209 | 79 | 173 | 115 | 205 |
| 31 | 40 | 231 | 152 | 25 | 36 | 228 | 156 | 28 |
| 184 | 104 | 216 | 72 | 188 | 100 | 220 | 68 | 191 |
| 244 | 134 | 12 | 62 | 241 | 130 | 15 | 55 | 236 |
| 198 | 90 | 162 | 126 | 194 | 94 | 169 | 118 | 201 |
| 1 | 53 | 248 | 139 | 8 | 46 | 252 | 146 | 4 |
| 171 | 117 | 203 | 85 | 178 | 110 | 210 | 78 | 176 |
| 230 | 154 | 26 | 34 | 226 | 158 | 30 | 41 | 233 |
| 217 | 71 | 190 | 98 | 222 | 66 | 183 | 105 | 215 |
| 17 | 55 | 235 | 137 | 21 | 59 | 242 | 133 | 14 |
| 169 | 119 | 201 | 87 | 165 | 123 | 197 | 91 | 161 |

Fig. 4B

| 244 | 134 | 12 | 61 | 240 | 131 | 16 | 54 | 238 |
| --- | --- | --- | --- | --- | --- | --- | --- | --- |
| 198 | 90 | 163 | 125 | 195 | 93 | 170 | 118 | 202 |
| 1 | 52 | 248 | 140 | 8 | 45 | 251 | 147 | 5 |
| 172 | 116 | 204 | 84 | 179 | 109 | 211 | 77 | 174 |
| 230 | 154 | 26 | 36 | 227 | 157 | 29 | 43 | 234 |
| 218 | 70 | 189 | 99 | 220 | 67 | 181 | 106 | 213 |
| 17 | 57 | 236 | 135 | 20 | 60 | 243 | 132 | 13 |
| 167 | 121 | 199 | 89 | 164 | 124 | 196 | 92 | 160 |
| 250 | 149 | 6 | 47 | 252 | 145 | 4 | 52 | 245 |
| 212 | 75 | 177 | 111 | 209 | 79 | 173 | 115 | 205 |
| 31 | 40 | 231 | 152 | 25 | 36 | 228 | 156 | 28 |
| 184 | 104 | 216 | 72 | 188 | 100 | 220 | 68 | 191 |
| 244 | 134 | 12 | 62 | 241 | 130 | 15 | 55 | 236 |
| 198 | 90 | 162 | 126 | 194 | 94 | 169 | 118 | 201 |
| 1 | 53 | 248 | 139 | 8 | 46 | 252 | 146 | 4 |
| 171 | 117 | 203 | 85 | 179 | 110 | 210 | 78 | 176 |
| 230 | 154 | 26 | 34 | 226 | 158 | 30 | 41 | 233 |
| 217 | 71 | 190 | 98 | 222 | 66 | 183 | 105 | 215 |
| 17 | 55 | 235 | 137 | 21 | 59 | 242 | 133 | 14 |
| 169 | 119 | 201 | 87 | 165 | 123 | 197 | 91 | 161 |

Fig. 6F

| 1 | 4 | 32 | 62 | 59 | 64 | 34 | 6 |
|---|---|---|---|---|---|---|---|
| 8 | 18 | 40 | 55 | 37 | 53 | 46 | 16 |
| 20 | 24 | 50 | 27 | 21 | 25 | 51 | 30 |
| 36 | 48 | 41 | 13 | 9 | 11 | 43 | 58 |
| 60 | 63 | 33 | 5 | 2 | 3 | 31 | 61 |
| 38 | 54 | 45 | 15 | 7 | 17 | 39 | 56 |
| 22 | 26 | 52 | 29 | 19 | 23 | 49 | 28 |
| 10 | 12 | 44 | 57 | 35 | 47 | 42 | 14 |

Fig. 6G

| | 16 | 128 | 248 | 236 | 256 | 136 | 24 |
|---|---|---|---|---|---|---|---|
| 32 | 72 | 160 | 220 | 148 | 212 | 184 | 64 |
| 80 | 96 | 200 | 108 | 84 | 100 | 204 | 120 |
| 144 | 192 | 164 | 52 | 36 | 44 | 172 | 232 |
| 240 | 252 | 132 | 20 | | 12 | 124 | 244 |
| 152 | 216 | 180 | 60 | 28 | 68 | 156 | 224 |
| 88 | 104 | 208 | 116 | 76 | 92 | 196 | 112 |
| 40 | 48 | 176 | 228 | 140 | 188 | 168 | 56 |

Fig. 6H

| 70 | 88 | 256 | 436 | 418 | 448 | 268 | 100 |
|---|---|---|---|---|---|---|---|
| 112 | 172 | 304 | 394 | 286 | 382 | 340 | 160 |
| 184 | 208 | 364 | 226 | 190 | 214 | 370 | 244 |
| 280 | 352 | 310 | 142 | 118 | 130 | 322 | 412 |
| 424 | 442 | 262 | 94 | 76 | 82 | 250 | 430 |
| 292 | 388 | 334 | 154 | 106 | 166 | 298 | 400 |
| 196 | 220 | 376 | 238 | 178 | 202 | 358 | 232 |
| 124 | 136 | 328 | 406 | 274 | 346 | 316 | 148 |

Fig. 6I

| 17 | 22 | 64 | 109 | 104 | 112 | 67 | 25 |
|----|----|----|-----|-----|-----|----|----|
| 28 | 43 | 76 | 98 | 71 | 95 | 85 | 40 |
| 46 | 52 | 91 | 56 | 47 | 53 | 92 | 61 |
| 70 | 88 | 77 | 35 | 29 | 32 | 80 | 103 |
| 106 | 110 | 65 | 23 | 19 | 20 | 62 | 107 |
| 73 | 97 | 83 | 38 | 26 | 41 | 74 | 100 |
| 49 | 55 | 94 | 59 | 44 | 50 | 89 | 58 |
| 31 | 34 | 82 | 101 | 68 | 86 | 79 | 37 |

Fig. 7A

Text Test Text Test

Fig. 7B(Related Art)

Text Test Text Test

Fig. 7C

Text Test Text Test

IMAGE FORMING APPARATUS TO SAVE TONER AND METHOD TO CONTROL THE SAME

CROSS-REFERENCE TO RELATED APPLICATIONS

This application claims the benefit of Korean Patent Application No. 2007-0016013, filed on Feb. 15, 2007 in the Korean Intellectual Property Office, the disclosure of which is incorporated herein by reference.

BACKGROUND OF THE INVENTION

1. Field of the Invention

The present general inventive concept relates to an image forming apparatus, and more particularly, to an image forming apparatus to save toner and a method to control the same which can increase the clearness of data (for example, images or characters) on its output material while achieving toner saving.

2. Description of the Related Art

An image forming apparatus such as a printer generally uses halftoning to print images. Halftoning is a method to represent shades of gray using halftone cells, each in the form of a lattice including a number of dots. This method represents a shade of gray using a corresponding number of dots displayed in a halftone cell.

A halftone image is not a continuous tone image like that on a full-color printout of a Dye Diffusion Thermal Transfer (DDTT) printer. However, when viewed at a certain distance, a halftone image is viewed as if it is a continuous image rather than a combination of dots.

Image data input to such an image forming apparatus is represented with 256 gray levels. The image forming apparatus uses the halftoning method since it cannot arbitrarily vary the density of toner applied to a sheet of paper, like a light emitter of a computer monitor or the like which can arbitrarily vary its luminance, and can only determine whether or not to apply toner to a sheet of paper.

Reference will now be made to a conventional image output method for an image forming apparatus.

FIG. 1A illustrates example original image data, FIG. 1B illustrates an enlarged digital image of part of the original image data, FIG. 1C illustrates a halftone table corresponding to the digital image illustrated in FIG. 1B, FIG. 1D illustrates halftoning result values obtained by comparing grayscale values of the digital image illustrated in FIG. 1B with the halftone table illustrated in FIG. 1C, and FIG. 1E illustrates dot images corresponding to the halftoning result values illustrated in FIG. 1D.

As illustrated in FIGS. 1A to 1D, the image forming apparatus compares grayscale values of a digital image of an original image with a halftone table and outputs halftoning result values.

The image forming apparatus represents the halftoning result values by corresponding dot images as illustrated in FIG. 1E and discharges toner to the represented dot images to print the image data.

However, printing the image data in this manner increases the amount of toner consumed. An electro-photographic printer, such as a laser printer, having a toner saving function has been developed and used to reduce toner consumption.

FIG. 2A illustrates halftoning result values of a conventional image forming apparatus having one toner saving function, FIG. 2B illustrates dot images corresponding to the halftoning result values illustrated in FIG. 2A, and FIG. 2C illustrates halftoning result values of a conventional image forming apparatus having another toner saving function. When the user 105 has selected a document for printing, a controller in the printer (i.e., the image forming apparatus) determines whether or not the toner saving function has been selected before printing the document. When the toner saving function has been selected, the controller of the printer supplies a lower voltage than a default voltage to a developer roller.

This reduces the amount of toner provided to a photosensitive drum to allow low-density images to be printed on a sheet of paper as illustrated in FIG. 2C.

In another method to reduce toner consumption, the image forming apparatus omits printing of some pixels at regular intervals of those of the original image data, thereby saving toner.

More specifically, as illustrated in FIGS. 2A and 2B, the image forming apparatus prevents toner from being discharged for even toner lines, thereby saving 50% of the toner.

Although the conventional image forming apparatus having such a toner saving function can reduce toner consumption, it cannot accurately reproduce the original image, thus leading to a reduction in the readability of letters and a failure to provide a printout having sharp details (for example, images or characters).

SUMMARY OF THE INVENTION

The present general inventive concept provides an improved image forming apparatus to save toner and a method to control the same to increase the readability of printed letters while achieving toner saving and also to provide a printout having sharp details (for example, images or other characters).

Additional aspects and/or advantages of the present general inventive concept will be set forth in part in the description which follows and, in part, will be obvious from the description, or may be learned by practice of the general inventive concept.

The foregoing and/or other aspects of the present general inventive concept may be achieved by providing an image forming apparatus to save toner, including a determinator to receive a command signal to print and then to determine whether or not the received command signal is a command signal for a toner saving mode, a storage unit to store a halftone table in which a Lines Per Inch (LPI) higher than a normal LPI is set, and a halftoning processor to generate and to output, if the received command signal is a command signal for the toner saving mode, halftoning result by comparing gray level values corresponding to pixels of received input image data with grayscale values of the stored halftone table.

The distance between predetermined reference dots of the halftone table in which the LPI higher than the normal LPI is set may be shorter than the distance between reference dots of a halftone table in which the normal LPI is set.

The image forming apparatus may further include a printing unit to print the halftoning result output from the halftoning processor.

The image forming apparatus may further include a pulse controller connected to an output of the halftoning processor to control a pulse width of a Laser Scanning Unit (LSU) to adjust a beam exposure time of the LSU.

The pulse controller may control the pulse width of the LSU to be reduced.

The storage unit may store a halftone table in which the normal LPI is set, wherein the halftoning processor generates and outputs, if the received command signal is not a command signal for the toner saving mode, halftoning result by comparing gray level values corresponding to pixels of the received input image data with grayscale values of the stored halftone table in which the normal LPI is set.

The foregoing and/or other aspects of the present general inventive concept may also be achieved by providing a method to control an image forming apparatus to save toner, the method including receiving a command signal to print and determining whether or not the received command signal is a command signal for a toner saving mode, and performing a halftoning process to generate and to output, if the received command signal is a command signal for the toner saving mode, halftoning result by comparing gray level values corresponding to pixels of received input image data with grayscale values of a stored halftone table in which a Lines Per Inch (LPI) higher than a normal LPI is set.

The distance between predetermined reference dots of the halftone table in which the LPI higher than the normal LPI is set may be shorter than the distance between reference dots of a halftone table in which the normal LPI is set.

The method may further include printing the halftoning result output in the halftoning process.

The method may further include controlling a pulse width of a Laser Scanning Unit (LSU) to adjust a beam exposure time of the LSU after the halftoning process.

The controlling the pulse width may include controlling the pulse width to be reduced.

The halftoning process may include generating and outputting, if the received command signal is not a command signal for the toner saving mode, halftoning result by comparing gray level values corresponding to pixels of received input image data with grayscale values of a stored halftone table in which the normal LPI is stored.

The foregoing and/or other aspects of the present general inventive concept may also be achieved by providing an image forming apparatus including a storage unit to store a halftone table having a lines per inch (LPI) with respect to a normal LPI, and a halftoning processor to generate halftoning information on gray level values of input image data according to the LPI and a toner saving mode, and to generate information on gray level values of the input image data according to normal LPI and a non-toner saving mode.

The foregoing and/or other aspects of the present general inventive concept may also be achieved by providing method to control an image forming apparatus to save toner, the method including determining whether or not a request has been made to activate a toner save mode, and generating halftoning result using a halftone table having a higher Lines Per Inch (LPI) than a normal LPI when a request has been made to activate the toner save mode.

Generating the halftoning result using the halftone table may include reading a halftone table having a higher LPI than the normal LPI when a request has been made to activate the toner save mode, and generating halftoning result by comparing gray level values of print data with gray level values of the read halftone table.

Generating halftoning result information may include using a halftone table having the normal LPI when no request has been made to activate the toner save mode.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 1A illustrates exemplary original image data;

FIG. 1B illustrates an enlarged digital image of part of the original image data of FIG. 1A;

FIG. 1C illustrates a halftone table corresponding to the digital image illustrated in FIG. 1B;

FIG. 1D illustrates halftoning result values obtained by comparing grayscale values of the digital image illustrated in FIG. 1B with the halftone table illustrated in FIG. 1C;

FIG. 2A illustrates halftoning result values of a conventional image forming apparatus having one toner saving function;

FIG. 4A illustrates exemplary grayscale values of a halftone table of an image forming apparatus to save toner according to the present general inventive concept;

FIG. 4B illustrates halftoning result of an image forming apparatus to save toner according to the present general inventive concept using the exemplary grayscale values of FIG. 4A;

FIGS. 6A to 6I illustrate an embodiment of a procedure according to the present general inventive concept in which grayscale values are assigned to a halftone table;

FIG. 7A illustrates exemplary text that is input to the image forming apparatus according to the present general inventive concept;

FIG. 7B illustrates halftoning result obtained by an image forming apparatus that uses a halftoning table with a normal LPI according to a conventional toner saving function;

FIG. 7C illustrates halftoning result obtained by the image forming apparatus to save toner according to the present general inventive concept.

DETAILED DESCRIPTION OF THE PREFERRED EMBODIMENTS

Figure 1E:
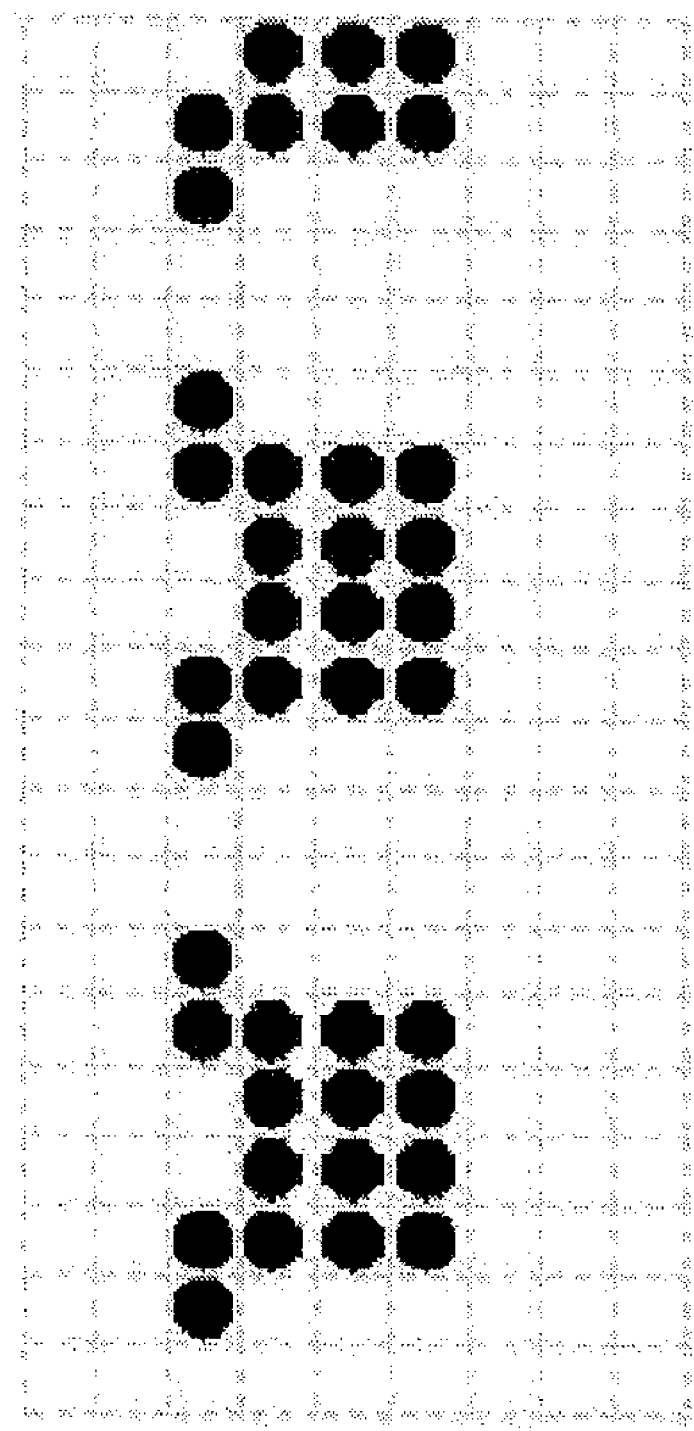
FIG. 1E illustrates dot images corresponding to the halftoning result values illustrated in FIG. 1D.
Figure 2B:
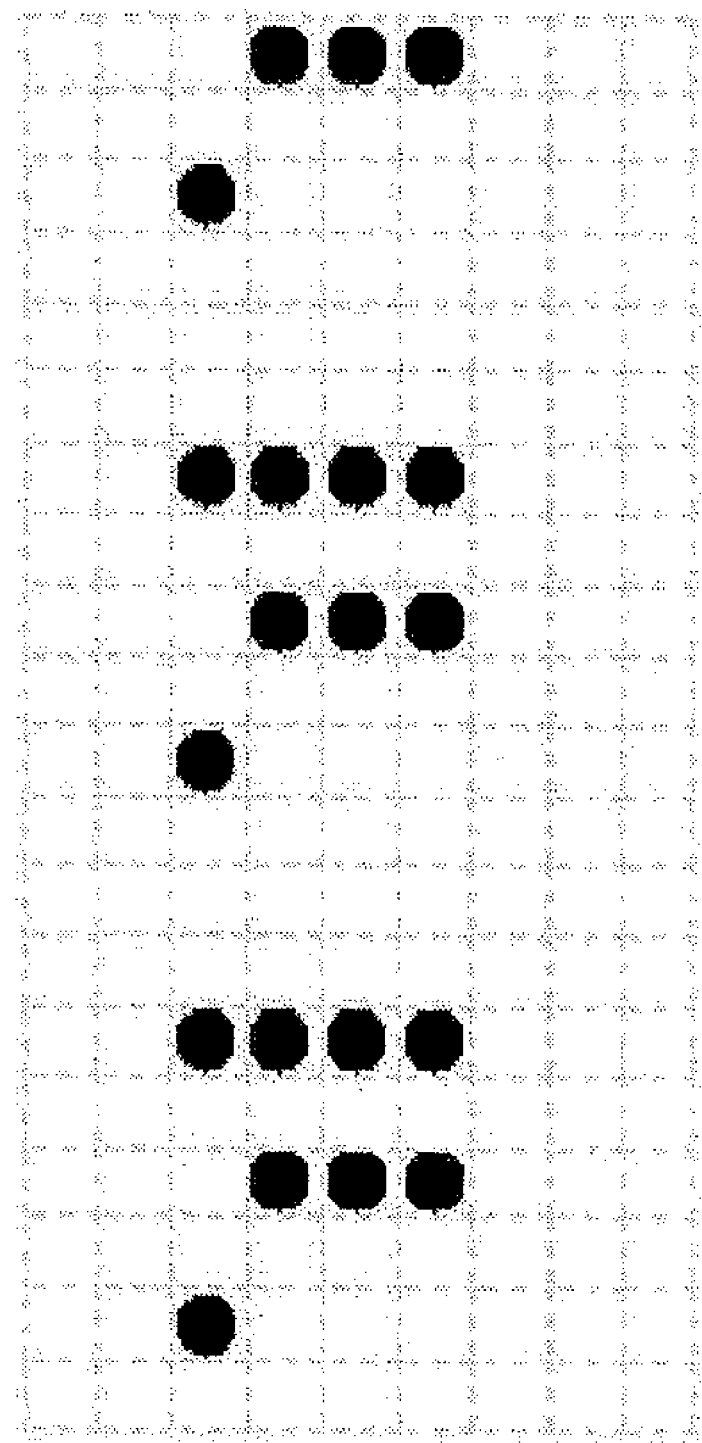
FIG. 2B illustrates dot images corresponding to the halftoning result values illustrated in FIG. 2A.
Figure 2C:
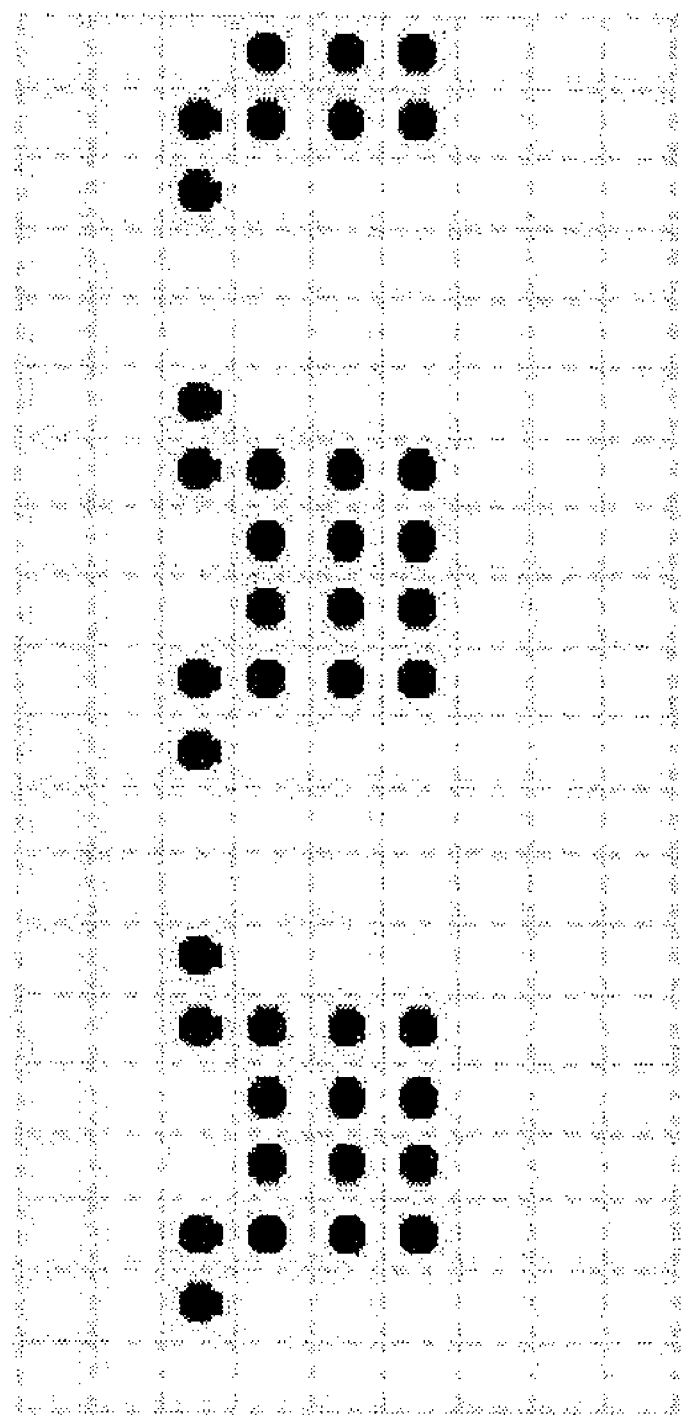
FIG. 2C illustrates halftoning result values of a conventional image forming apparatus having another toner saving function.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 3:
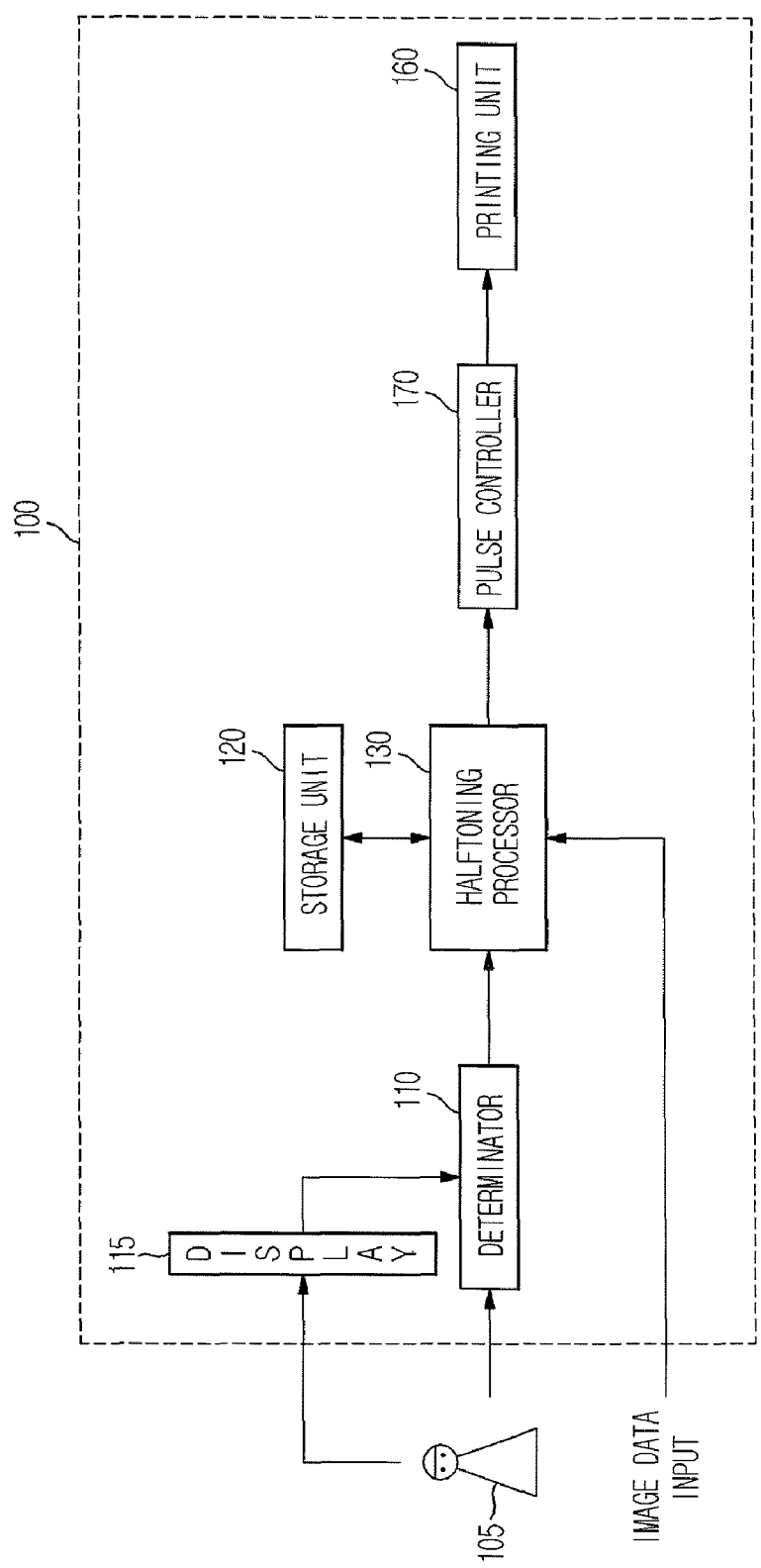
FIG. 3 is a block diagram of an image forming apparatus to save toner according to an embodiment of the present general inventive concept.

FIG. 3 is a block diagram of an image forming apparatus to save toner according to an embodiment of the present general inventive concept. As illustrated, the image forming apparatus 100 to save toner includes a determinator 110, a storage unit 120, and a halftoning processor 130.

First, the determinator 110 receives from a user 105 a command signal to print and determines whether or not the received command signal is a command signal for a toner saving mode.

Generally, the image forming apparatus includes a display 115, such as an LCD and a plurality of operating buttons, and is constructed to allow the user 105 to select a print mode and to adjust print density using the operating buttons.

The operating buttons include a button for the toner saving mode to reduce toner consumption of input image data and a button to deactivate the toner saving mode. The decision to select, or to not select, a toner saving mode may also be accomplished by user 105 through use of a single button of display 115 which can be toggled between a toner saving mode function and a normal (non-toner saving) operating mode function.

When the user 105 has selected the button for the toner saving mode, the determinator 110 receives a command signal for the toner saving mode through the selection of the button and determines whether or not the received command signal is a command signal for the toner saving mode.

This control is also possible through a driver of an external PC (not illustrated) and the user 105 can also select the toner saving mode through the driver of the PC. The command signal and an image data input may be input to the determinator 110 or the divider 140 from the PC or by the user 105.

The storage unit 120 stores a halftone table in which a Lines Per Inch (LPI) higher than a normal LPI is set.

Here, it is possible that the distance between predetermined reference dots of the stored halftone table in which an LPI higher than the normal LPI is set be shorter than the distance between reference dots of a halftone table in which the normal LPI is set.

Thus, when the halftone table in which an LPI higher than the normal LPI is set is designed, the distance between predetermined reference dots of the halftone table is set to be shorter than the distance between reference dots of a halftone table in which the normal LPI is set.

The storage unit 120 may be a storage medium capable of storing a halftone table, such as a DRAM, an SDRAM, an RDRAM, a DDRAM, or an SRAM.

In the case of a host-based graphical device interface (GDI) printer, halftoning is performed at an external PC (not illustrated) and therefore it is possible that the halftone table be stored in a driver of the PC.

Reference will now be made to a procedure in which a halftone table is designed for use according to the present general inventive concept.

We first describe the definitions of basic terms. The term "Lines Per Inch (LPI)" refers to the number of lines per inch as a screen frequency and the term "dot shape" refers to a shape associated with the direction in which index values are increased or decreased, with respect to reference dots.

The term "screen angle" refers to the angle of a line taken between reference dots and the term "toner level" refers to a value regarding the relation between an index and an 8-bit level.

First, the LPI and the screen angle are determined before the halftone table is designed.

The LPI and the screen angle are calculated using the following equation.

$$LPI = Resolution/(Linear\ Distance\ between\ Reference\ Dots)$$

Figure 5:
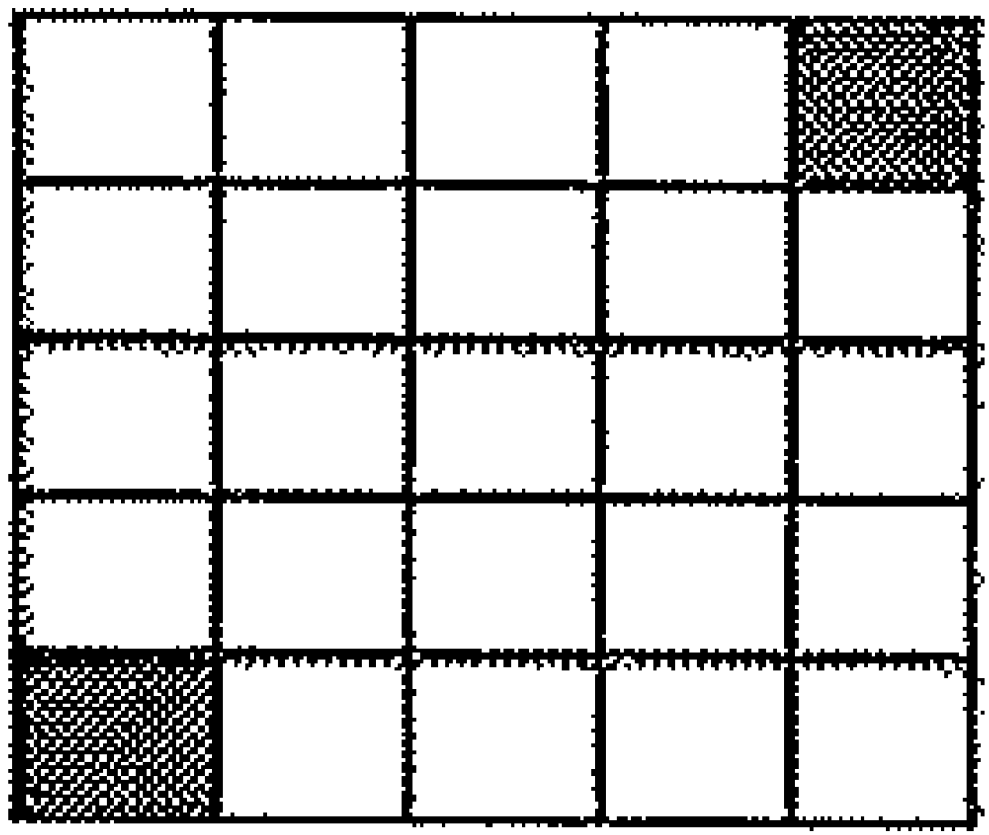
FIG. 5 illustrates an example halftone table used to determine an LPI according to the present general inventive concept.

FIG. 5 illustrates an example halftone table used to determine the LPI. For example, when the halftone table is a 5×5 cell with reference dots shaded in gray as illustrated in FIG. 5 and the resolution is 600 dpi, the distance between the reference dots is (4,4) when expressed in matrix form and is 5.656 (which equals 4×1.414) when numerically calculated.

Accordingly, the LPI is 600/5.656=106.082 and the screen angle is 45 degrees.

As the distance between the reference dots decreases, the LPI increases accordingly. The position of such a reference dot is referred to as a dot center.

When the LPI and the screen angle of the halftone table have been determined, the actual order in which indices are assigned to dots of the halftone table within a given range is determined and indices are then assigned to the dots of the halftone table.

FIGS. 6A to 6I illustrate an embodiment of a procedure in which grayscale values are assigned to a halftone table. First, reference dots are determined and indices are assigned to the reference dots illustrated in FIG. 6A.

Figure 6A:
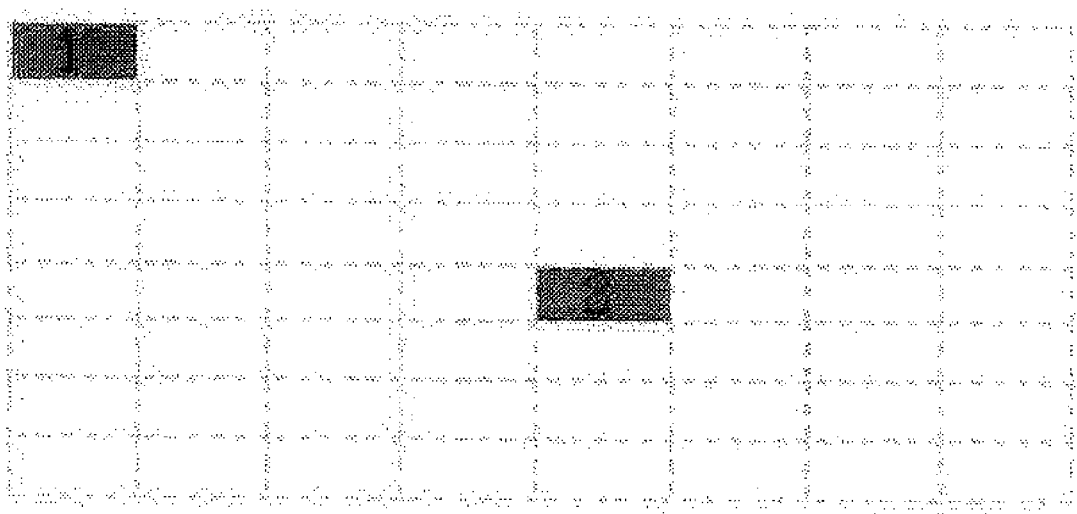
Figure 6B:
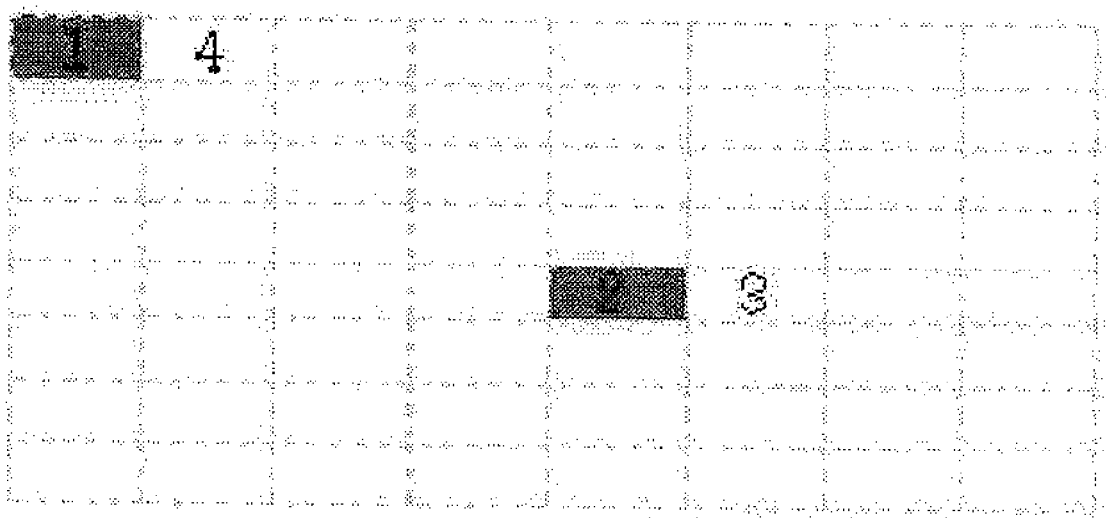
Figure 6C:
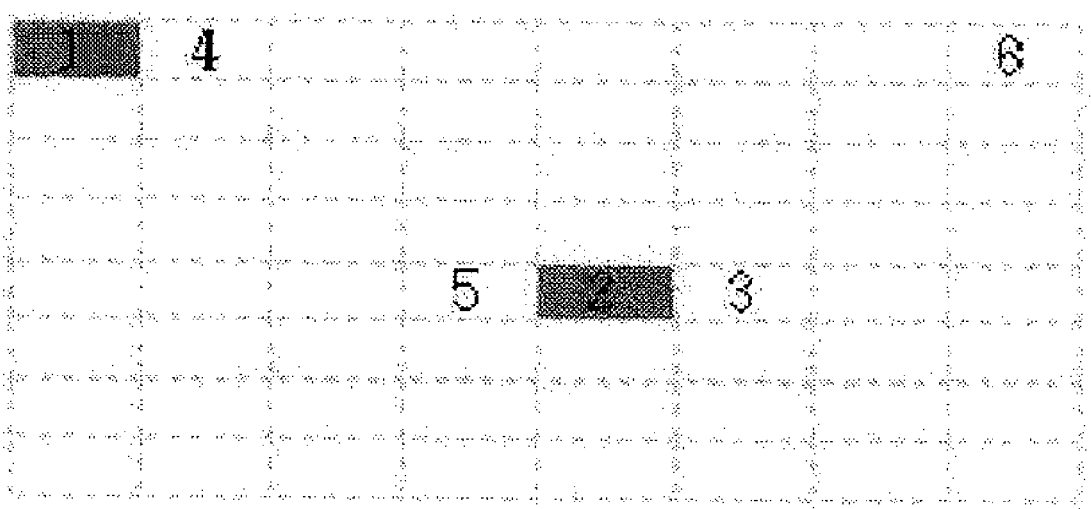

Then, the order of dots to which indices are assigned is determined and indices are assigned to dots in the determined order, starting from dots near the determined reference dots as illustrated in FIGS. 6B and 6C.

Figure 6D:
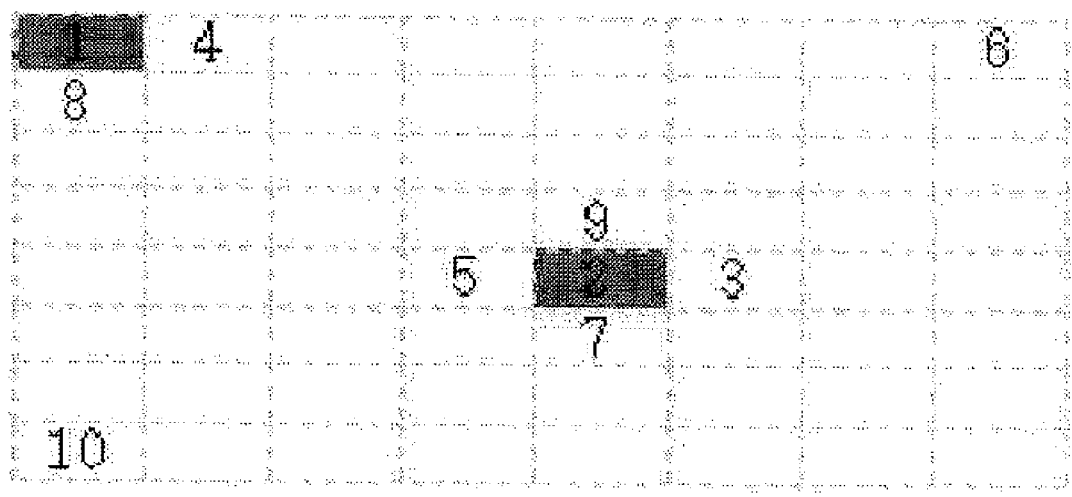
Figure 6E:
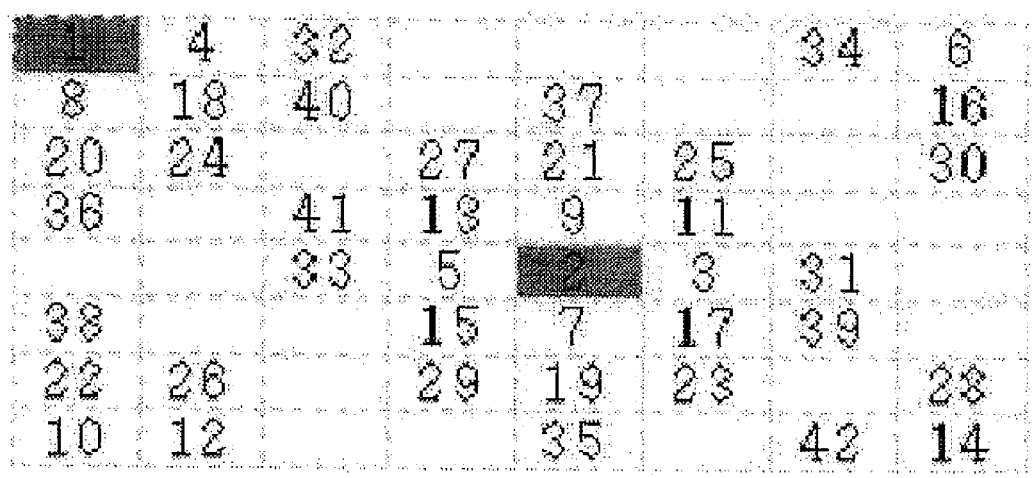

As illustrated in FIGS. 6D to 6F, indices are also assigned to the boundaries of the halftone table, considering the fact that halftone tables are sequential.

After indices are assigned to the halftone table in this manner, the halftone table is converted to a halftone table having (8-bit) levels of from 0 to 255 corresponding to the assigned indices. Here, since the halftone table is 8×8 and thus the number of possible index values is only 64, all the indices are multiplied by 4(=256/64) in order to match the number "256" of the levels "0 to 255".

Although the level "256" is illustrated in FIG. 6G, the level "256" is actually converted to "255" since the level "256" is not present in the range of 0 to 255.

In practice, a 24×24 or greater halftone table is used and therefore indices of 256 or lower levels are assigned to the table as illustrated in FIG. 6I to match the 256 levels, instead of assigning indices of higher than 256 levels as illustrated in FIG. 6H.

For example, if the halftone table is part of a 32×32 halftone table, possible index values are from 1 to 1024 and, to match the 256 levels, the indices are multiplied by 0.24, where 0.24=(256/1024), to obtain a halftone table with indices (gray level values) as illustrated in FIG. 6I.

However, in practice, the indices are not simply multiplied by a factor and, instead, a range of indices with a luminance difference of 256 levels on a printing medium are identified and grayscale values of from 0 to 255 are assigned to the indices.

The present general inventive concept will now be described in more detail based on the above description.

FIG. 4A illustrates exemplary grayscale values of a halftone table of an image forming apparatus to save toner according to the present general inventive concept. As illustrated in FIG. 4A, the storage unit 120 stores a halftone table in which an LPI higher than a normal LPI is set. Here, it is preferable that the distance between predetermined reference dots of the halftone table in which an LPI higher than the normal LPI is set be shorter than the distance between reference dots of a halftone table in which the normal LPI is set.

The distance between the predetermined reference dots is the distance between the positions (dot centers) of the reference dots of the halftone table. Grayscale values denoted by numerals 244, 240, 238, 248, and 251 in FIG. 4A are those of the reference dots.

Accordingly, the distance between the reference dots (the dot centers) in the halftone table in which the LPI higher than the normal LPI is set is shorter than the distance between the reference dots in the halftone table in which the normal LPI is set as illustrated in FIG. 1C representing a halftone table of a conventional image output method for an image forming apparatus without a toner saving function.

If the received command signal from user 105 is a command signal for the toner saving mode, the halftoning processor 130 generates and outputs halftoning result by comparing gray level values corresponding to pixels of the input image data with the grayscale values of the stored halftone table.

The halftone table according to the present general inventive concept described above is set in the form of a matrix having a predetermined number of elements so as to use a plurality of pixels as a unit for comparison.

Then, gray level values corresponding to pixels of the input image data are compared respectively with the grayscale values (at corresponding positions) of the halftone table to generate image data to print as the comparison result.

More specifically, the halftoning processor 130 compares each of the gray level values corresponding to the pixels of the input image data with a grayscale value (at a corresponding position) of the halftone table and generates on-data to allow printing only when the gray level value of the input image data is higher than the grayscale value of the halftone table (or alternatively only when the gray level value is equal to or higher than the grayscale value).

Contrary to this description, the apparatus may also perform printing when the gray level of the input image data is lower than the grayscale value of the halftone table although it does not perform printing when it is higher than the grayscale value of the halftone table. Whether the apparatus performs printing when the gray level value of the input image data is lower or higher than the grayscale value of the halftone table is determined according to which value is actually used to represent black or white (more specifically, according to whether the black value used is 0 or 255).

That is, the halftoning processor 130 generates halftoning result for a result value of "1" when the gray level value of the input image data is higher than the grayscale value of the halftone table and allows toner to be discharged to an image at the corresponding position and generates halftoning result for a result value of "0" when the gray level value of the input image data is less than or equal to the grayscale value of the halftone table and prevents toner from being discharged to an image at the corresponding position.

Figure 4C:
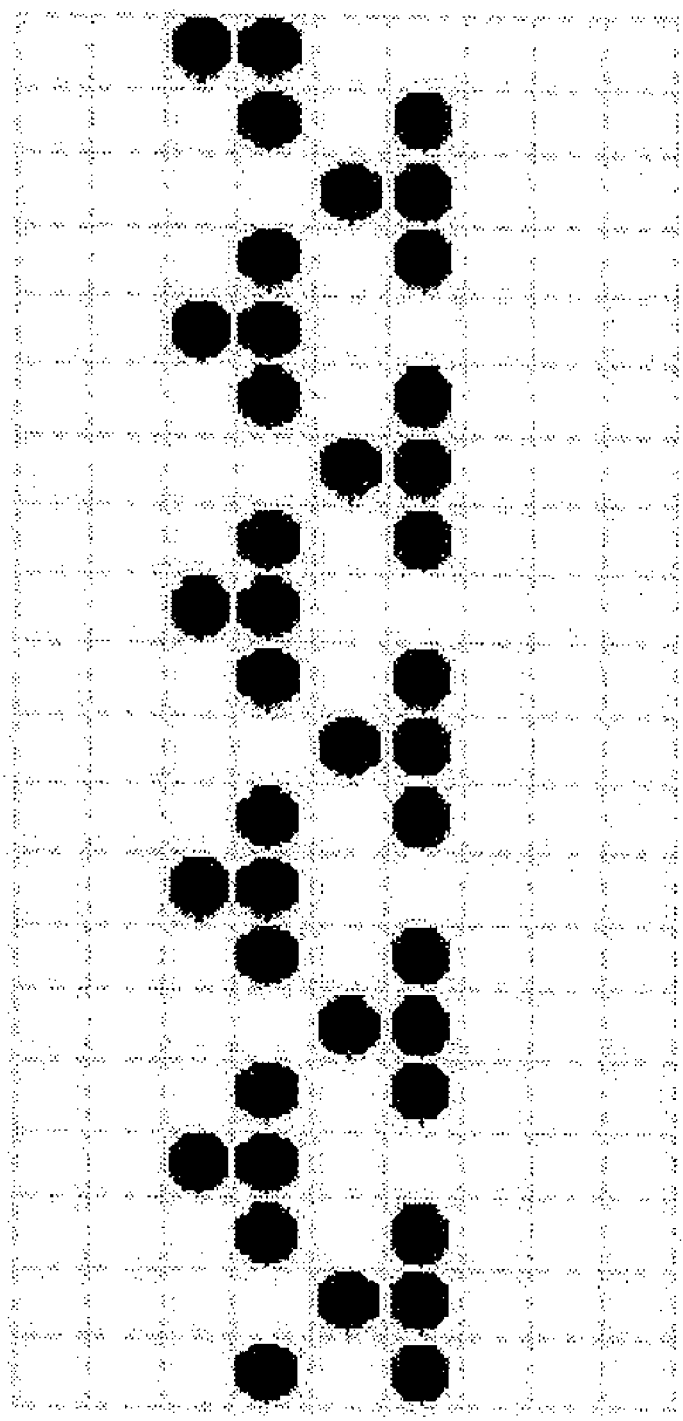
FIG. 4C illustrates dot images corresponding to the halftoning result illustrated in FIG. 4B.

FIG. 4B illustrates halftoning result of an image forming apparatus to save toner according to the present general inventive concept using the grayscale values of FIG. 4A, and FIG. 4C illustrates dot images corresponding to the halftoning result illustrated in FIG. 4B. As illustrated in FIG. 4B, halftoning result for a result value of "1" is generated for each section shaded in gray in which the gray level value of the input image data is higher than the corresponding grayscale value of the halftone table. As illustrated in FIG. 4C, each shaded section is represented as a dot image so that toner is discharged for the section.

Here, the halftoning processor 130 sequentially and repeatedly compares each of the gray level values of the entire image data with the corresponding grayscale value of the halftone table and then generates and outputs halftoning result as the comparison result.

The image forming apparatus 100 to save toner according to the present general inventive concept further includes a printing unit 160. After the halftoning processor 130 performs halftoning in the above described manner, the printing unit 160 performs printing of the halftoning result output from the halftoning processor 130.

In many cases, the size of a halftone table is less than that of image data. In these cases, it is preferable that the halftoning processor 130 repeatedly use the halftone table when performing halftoning in the above manner.

As illustrated in FIG. 3, the image forming apparatus 100 to save toner according to the present general inventive concept further includes a pulse controller 170 that controls the pulse width of a Laser Scanning Unit (LSU) of printing unit 160 to adjust a beam exposure time.

The exposure time of an LSU beam provided to a photosensitive drum of printing unit 160 is controlled according to the pulse width. The amount of toner discharged is reduced by controlling the pulse width to be reduced to control the exposure time of the LSU beam.

Figure 4D:
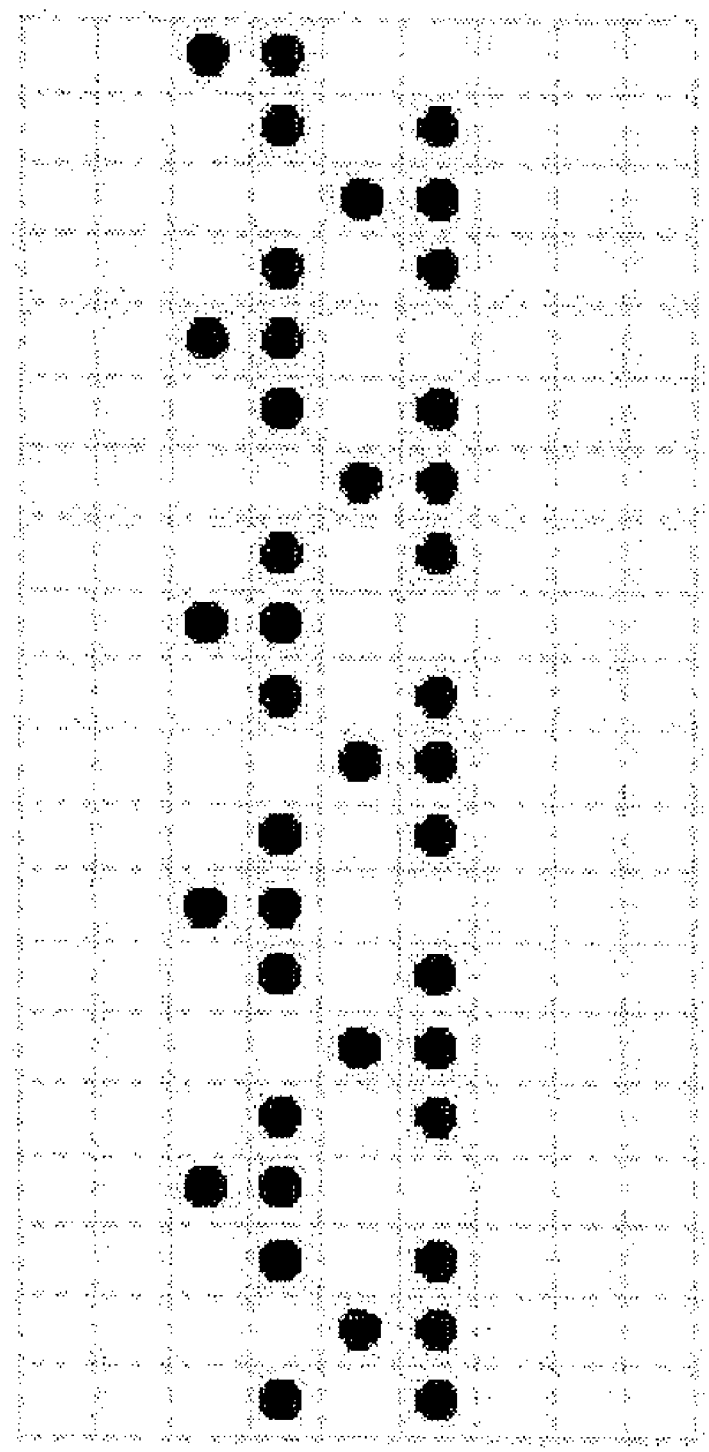
FIG. 4D illustrates dot images having reduced pulse widths of the dot images illustrated in FIG. 4C.

FIG. 4D illustrates dot images having reduced pulse widths of the dot images illustrated in FIG. 4C. When compared to the dots of FIG. 4C, the amount of toner discharged in the dots of FIG. 4D is reduced as the pulse width has been decreased, thereby reducing the amount of toner consumed by printing unit 160.

Figure 7B:
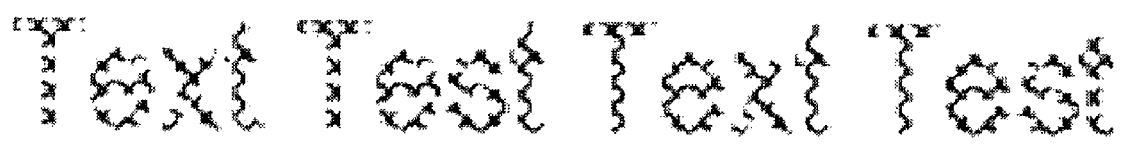
Figure 7C:
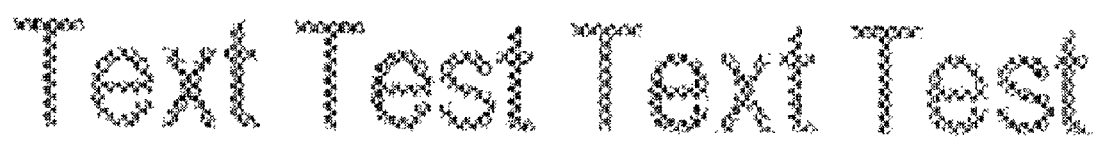

FIG. 7A illustrates example text that is input as image data to the image forming apparatus 100, FIG. 7B illustrates halftoning result obtained by an image forming apparatus that uses a halftoning table having a normal LPI according to a conventional toner saving function, and FIG. 7C illustrates halftoning result obtained by the image forming apparatus 100 to save toner according to the present general inventive concept. As can be seen from FIGS. 7A to 7C, the present general inventive concept increases the probability of discharging toner at boundaries of images by performing halftoning processing using a halftone table in which an LPI higher than the normal LPI is set.

In the above manner, the present general inventive concept generates boundaries of images of letters to increase the readability of the letters, and can generate boundaries of other characters or images to be printed to increase the viewability of the other characters or images.

The storage unit 120 is constructed to further store a half tone table in which the normal LPI is set. If the received command signal from user 105 is not a command signal for the toner saving mode, the halftoning processor 130 generates and outputs halftoning result by comparing gray level values corresponding to pixels of the input image data with grayscale values of the stored halftone table in which the normal LPI is set.

That is, when the received command signal is not a command signal for the toner saving mode, the halftoning processor 130 needs to perform printing of the normal printing mode and thus generates the halftoning result as illustrated in FIG. 1D.

Reference will now be made to a procedure to control the image forming apparatus 100 to save toner according to the present general inventive concept.

Figure 8:
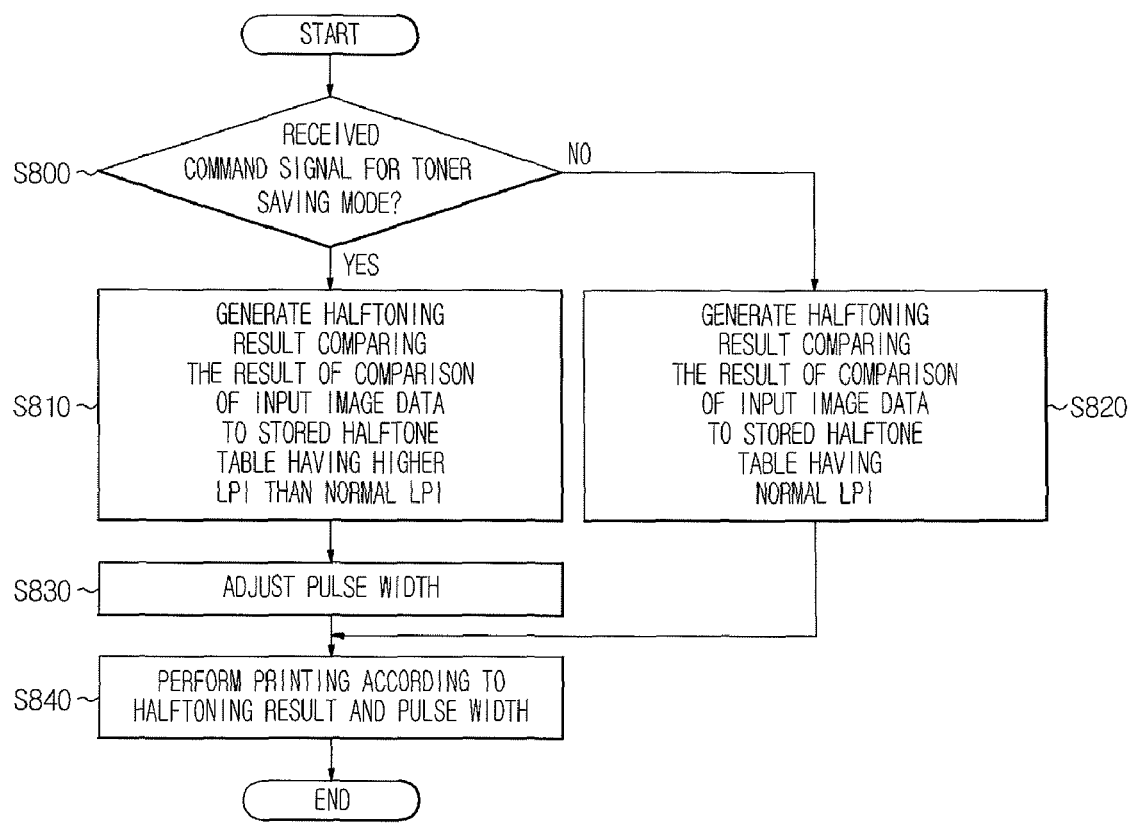
FIG. 8 is a flow chart illustrating a procedure to control the image forming apparatus to save toner according to an embodiment of the present general inventive concept.

FIG. 8 is a flow chart illustrating a procedure to control the image forming apparatus 100 to save toner according to a preferred embodiment of the present general inventive concept. First, the image forming apparatus 100 determines whether or not a received command signal from user 105 is a command signal for the toner saving mode (operation S800).

If the received command signal is a command signal for the toner saving mode, the image forming apparatus 100 generates a halftoning result containing the result of the comparison of the input image data to a stored halftone table having a higher LPI than a normal LPI (operation S810).

The image forming apparatus 100 then compares gray level values to grayscale values of a stored halftone table in which an LPI higher than the normal LPI is set and generates and outputs halftoning result (operation S810).

In this embodiment, it is preferable that the distance between predetermined reference dots (dot centers) of the halftone table in which an LPI higher than the normal LPI is set be shorter than the distance between reference dots of a halftone table in which the normal LPI is set.

Then, the image forming apparatus controls the pulse width of an LSU to adjust a beam exposure time of the LSU to reduce the pulse width (operation S830) and performs printing according to the halftoning result and the pulse width (operation S840).

On the other hand, if the received command signal from user 105 is not a command signal for the toner saving mode, the image forming apparatus 100 generates a halftoning result containing the result of the comparison of the input image data to the stored halftone table having a normal LPI (operation S820).

The image forming apparatus then performs normal (non-toner saving) printing according to the halftoning result and the pulse width (operation S840).

As is apparent from the above description, the present general inventive concept provides an image forming apparatus to save toner and a method to control the same. Halftoning is performed using a halftone table in which an LPI higher than a normal LPI is set, thereby increasing the probability of discharging toner at boundaries of images. This increases the readability of letters while saving toner and increases the clearness of data (for example, images or other characters) printed on a printing medium.

Although a few embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:

1. An image forming apparatus to save toner, comprising:
   a storage unit to store a first halftone table and a second halftone table, the first halftone table having a Lines Per Inch (LPI) higher than the second halftone table; and
   a halftoning processor to generate and to output a halftoning result by comparing gray level values corresponding to pixels of received input image data with grayscale values of the first halftone table if a command signal to print is received in a toner saving mode, and by comparing gray level values corresponding to pixels of the received input image data with grayscale values of the second halftone table if a command signal to print is received in a non-toner saving mode,
   wherein a size of toner dots corresponding to the halftoning result in the toner saving mode is less than a size of toner dots corresponding to the halftoning result in the non-toner saving mode.

2. The image forming apparatus according to claim 1, wherein a distance between predetermined reference dots of the first halftone table is shorter than a distance between reference dots of the second halftone table.

3. The image forming apparatus according to claim 1, further comprising:
   a printing unit to print the halftoning result output from the halftoning processor.

4. The image forming apparatus according to claim 1, further comprising:
   a pulse controller connected to an output of the halftoning processor to control a pulse width of a Laser Scanning Unit (LSU) to adjust a beam exposure time of the LSU.

5. The image forming apparatus according to claim 4, wherein the pulse controller controls the pulse width of the LSU to be reduced when the command signal to print is received in the toner saving mode.

6. A method to control an image forming apparatus to save toner, the method comprising:
   performing a halftoning process to generate and to output a halftoning result by comparing gray level values corresponding to pixels of received input image data with grayscale values of a first stored halftone table in which a Lines Per Inch (LPI) is higher than a second stored halftone table if a command signal to print is received in a toner saving mode; and
   comparing gray level values corresponding to pixels of the received input image data with grayscale values of the second halftone table if a command signal is received in a non-toner saving mode,
   wherein a size of toner dots corresponding to the halftoning result in the toner saving mode is less than a size of toner dots corresponding to the halftoning result in the non-toner saving mode.

7. The method according to claim 6, wherein a distance between predetermined reference dots of the first halftone table is shorter than a distance between reference dots of the second halftone table.

8. The method according to claim 6, further comprising:
   printing the halftoning result output in the halftoning process.

9. The method according to claim 6, further comprising:
   controlling a pulse width of a Laser Scanning Unit (LSU) to adjust a beam exposure time of the LSU after the halftoning process.

10. The method according to claim 9, wherein controlling the pulse width comprises:
    controlling the pulse width of the LSU to be reduced when the command signal to print is received in the toner saving mode.

11. The method according to claim 6, wherein generating the halftoning result using the halftone table includes:
    reading the first halftone table when a request has been made to activate, the toner save mode; and
    generating the halftoning result by comparing gray levels of the input image data to gray level values of the read first halftone table.

* * * * *